United States Patent
Schofield et al.

(10) Patent No.: US 6,370,152 B1
(45) Date of Patent: Apr. 9, 2002

(54) DISTRIBUTED SNMP AGENT FOR FRAME RELAY SWITCHING NETWORK

(75) Inventors: Wade S. Schofield; W. Stuart Venters, both of Huntsville; Philip David Williams, Madison, all of AL (US)

(73) Assignee: Adtran, Inc., Huntsville, AL (US)

(*) Notice: Subject to any disclaimer, the term of this patent is extended or adjusted under 35 U.S.C. 154(b) by 0 days.

(21) Appl. No.: 09/088,159

(22) Filed: Jun. 1, 1998

Related U.S. Application Data

(60) Provisional application No. 60/048,103, filed on May 30, 1997.

(51) Int. Cl.[7] .................................................. H04J 3/02
(52) U.S. Cl. ...................... 370/432; 370/235; 370/397; 370/399; 370/401; 370/409
(58) Field of Search ................................. 370/235, 236, 370/237, 238, 257, 258, 395, 396, 397, 401, 402, 403, 404, 405, 432, 399, 409

(56) References Cited

U.S. PATENT DOCUMENTS

| | | | | |
|---|---|---|---|---|
| 5,095,480 A | * | 3/1992 | Fenner | 370/238 |
| 5,577,042 A | * | 11/1996 | McGraw, Sr. et al. | 370/257 |
| 5,805,595 A | * | 9/1998 | Sharper et al. | 370/442 |
| 5,907,696 A | * | 5/1999 | Stilwell et al. | 395/500 |

\* cited by examiner

*Primary Examiner*—Douglas Olms
*Assistant Examiner*—Shick Hom
(74) *Attorney, Agent, or Firm*—Allen, Dyer, Doppelt, Mlibrath & Gilchrist, P.A.

(57) ABSTRACT

A simple network management protocol (SNMP) agent is distributed among individual channel units of frame relay switching system, rather than in a proxy device. The SNMP agent is implemented by encoding the identity of an individual channel device for whom a data packet is intended in the community data string portion of an SNMP packet. For a read request, the address of a channel unit is encoded as an augmented community string, such as "public.#". For a write request, the address is encoded as an augmented community string, such as "private.#".

14 Claims, 3 Drawing Sheets

| PUBLIC. X |

| PRIVATE. Y |

DISTRIBUTED SNMP AGENT FOR FRAME RELAY SWITCHING NETWORK

CROSS-REFERENCE TO RELATED APPLICATION

The present application claims the benefit of U.S. Provisional Patent Application Ser. No. 60/048,103, filed May 30, 1997, assigned to the assignee of the present application and the disclosure of which is incorporated herein. In addition, the subject matter of the present application relates to that described in our co-pending U.S. patent application Ser. No. 09/088,461 (hereinafter referred to as the '461 application), filed on even data herewith, entitled: "Arbitration Mechanism for Statistically Multiplexed Frame Relay Switching System," by Stuart W. Venters et al., assigned to the assignee of the present application and the disclosure of which is incorporated herein.

FIELD OF THE INVENTION

The present invention relates to digital data communication systems, and is particularly directed to a new and improved management agent, that may be readily employed for simple network management protocol (SNMP), being distributed among individual channel units of a frame relay switching system, rather than in a proxy device interposed between the network and the channel units, with the address of an individual device being encoded in the community string portion of the SNMP packet.

BACKGROUND OF THE INVENTION

Frame relay (FR) switching networks enjoy widespread success for supplying digital data services—principally in support of local area network (LAN) integration across wide area facilities. Frame relay derives its benefit by multiplexing 'frames' of data, or packetized data traffic, from each of a plurality of physical circuits into a common or shared backbone network, so as to reduce overall transport requirements, by creating more efficient use of the available transport bandwidth.

Prior to the advent of frame relay switching systems, LAN integration required the purchase of point-to-point digital data services delivered via individual physical circuits. Among the advantages frame relay provides over point-to-point services are enhanced network reliability and troubleshooting, through redundant and highly manageable switching networks, multiple end-to-end connections via permanent virtual circuits (PVCS) over single physical interfaces, and lower deployment costs that often result in lower consumer fees.

In a typical implementation, rather than being dispersed throughout the network, the switching backbone is confined to a very limited geographic area, requiring significant back-haul support. In addition, in stark contrast to the widespread availability of central office voice switches, the number of available data switches is relatively small. Also, due to the nature of physical interface design, a frame relay switch is often not necessarily employed in a manner that makes full use of its frame processing functionality. By accessing the frame relay switch through point-to-point facilities, both data transport time and idle time are presented to the switch interface. The frame relay switch then becomes limited at the point of its physical port access, often mandating the purchase and installation of additional frame relay switches and line cards.

In order to better utilize frame relay switch capability, as well as increase the utilization of back-haul transport bandwidth, it is desirable to efficiently extend frame multiplexing to central offices, remote terminals (RTs) and customer premises equipment (CPE) environments in a manner that address current deployment schemes. For this purpose, it has been proposed to implement frame relay switching networks in an architecture of the type diagrammatically shown in FIG. 1.

In this architecture, a plurality of frame relay channel units (or frameports) 11 terminate a large number of access lines 13 from associated CPEs 15, and are coupled to an aggregate data link 21 from the network 23. The aggregate data link customarily has a data transport capacity that is considerably less than the cumulative data capacity of all of the access lines 13. Included within this architecture is an outgoing data transport access mechanism that statistically multiplexes outgoing data from the various CPEs 15 into a single data stream for transport over the aggregate data link 21. The use of statistically multiplexing serves to reduce the back-hauling of circuits to the data switch, thereby more efficiently utilizing aggregate data transport resources, since the data is multiplexed at the point of access (the respective frame relay channel units 11), rather than at the switch.

In order to provide an orderly and efficient allocation of the limited bandwidth of the aggregate link 21 to each access line 13 requesting transmission service, yet without allowing any individual access line to tie up the aggregate data link 21 during periods of inactivity or congestion, the statistical multiplexing of data from the access lines 13 onto the aggregate data link 21 is based upon a prescribed opportunity-to-transmit arbitration mechanism, that is distributed among all users of the system, so that the state of the system is effectively shared with each access line.

In the above-referenced co-pending '461 application, we describe a new and improved arbitration scheme, which calculates an arbitration value for each data line based upon a combination of parameters, including queuing delay and information customized for the particular configuration and traffic rate of that line. The calculated arbitration value is combined with a request to transmit or start bit and a physical location address code to produce a composite arbitration code, the respective bits of which are clocked onto a wire-ORed arbitration bus. As each channel unit's arbitration code is clocked onto the arbitration bus, a respective channel unit will perform a bit-by-bit comparison with the state of the bus as driven by other channel units, to determine whether that channel unit is to be given priority to transmit. Whenever a channel unit sees a difference between its bit value and that on the bus, the channel unit knows it has a lower priority and terminates its participation in the arbitration cycle. As a result, at the end of the arbitration cycle, only the channel unit having the largest priority will not have dropped out, allowing it to take ownership of the aggregate data link.

In the incoming or receive direction (from the network to the channel units), the system typically employs some form of supervisory management entity 25, such as a Hewlett-Packard "Open View" platform as a non-limiting example, which is connected to the network and manages the routing of data transmissions from the network to the individual channel units serving the end customers equipment, using an embedded in-band management scheme, such as industry standard SNMP, referenced above. Where the management scheme assigns an Internet protocol (IP) address per device, the overall management process becomes prohibitively complex and costly, as there can be literally thousands of IP addresses to allocate, assign and maintain.

An alternative approach, diagrammatically illustrated in FIG. 2, involves using a single, intermediary proxy device 30 as the management agent between the network manager and the data communication devices to be managed. This approach has the advantage that it allows a single supervisory device to manage a large number of data communication devices using a single IP address over a single access line. In addition, if the respective communication links 32 between the proxy agent device 30 and the managed devices employ a proprietary communication protocol, the managed devices can be made less expensive than would be the case if these devices were required to completely support SNMP protocol. However, the use of a proxy device has its shortcomings.

First of all, since the proxy device forms a junction of all incoming data packets from the network, a failure in the proxy device will result in a complete loss of management for all of the managed devices connected to it. Secondly, if a proprietary protocol is used between the proxy agent and the managed devices, the system becomes vendor-specific, rather than conforming with an industry standard, such as SNMP. Further, as new data communication devices are developed, the software within the proxy agent may have to be upgraded to allow it to be a proxy for the new devices, thereby adding to system complexity and cost.

SUMMARY OF THE INVENTION

In accordance with the present invention, the above-discussed shortcomings of conventional data routing management schemes are obviated by distributing the management agent among individual channel units of the system, without using any intermediate proxy device. Distributing the management agent is implemented by means of an address protocol employed by the management platform that encodes the (ASCII) community string portion of an SNMP packet to encode the address of an individual channel unit installed within a multi-device chassis or bank. In particular, each channel unit is programmed to discard any augmented community string message, that does not also include an associated ".#" appendix (where # is the physical location of the channel unit in the chassis), but to accept an augmented community string message, that also includes the associated ".#" appendix. Consequently, only the target channel unit will accept the SNMP message encoded with either of the prescribed community strings and the auxiliary "dot-#" appendix.

In a network architecture of the type described above, with reference to FIG. 1, since each of a plurality of data communication devices shares the same aggregate data link from the network, each channel unit will 'see' the same data traffic coming in from the network, and is continuously looking for an IP address within any incoming packet. Since the virtual circuit does not extend beyond the channel unit, all channel units within a common installation will assume that the IP address (data link circuit identifier) in the destination field is their identity.

To distribute the management agent across each of the channel units and distinguish among multiple devices, auxiliary device specific address information is embedded in the (ASCII) community string portion of the SNMP packet from the network to the channel units. Where the network-coupled management platform desires to specify a particular channel unit among a plurality of devices within a chassis, the community string is encoded by the management platform to include an auxiliary "dot-channel unit number" appendix to a community string that otherwise will evoke a response from only a single 'master' channel unit.

The master channel unit, such as that having the Ad lowest numbered installed location in the chassis, functions as an interrogatable chassis status information source, that can be accessed from the network-coupled management platform. The master channel unit may respond for the chassis with system parameters, to requests for occupation status of the chassis, and accept write messages to system level parameters. It then forwards that information to the other devices located in the same chassis.

To perform a read request to the master channel unit, a first prescribed community string (e.g., "public" as a non-limiting example) is employed. In order to write a message to the master channel unit, a second community string (e.g., "private" as a non-limiting example) is employed. Unless a given channel unit sees a prescribed community string appendix associated with only that channel unit, the message is discarded. As a result, all channel units other than the master channel unit will discard any message containing one of the above community strings without the appendix. This readily allows only the master channel unit to respond to SNMP messages encoded with either of the prescribed community strings.

To communicate with a particular channel unit within the chassis, the supervisory management platform uses the same community string for accessing the master channel unit, plus an auxiliary appendix that identifies the card slot number of the target channel unit, which number specifies the physical location or slot within the chassis where the channel unit of interest has been installed. For a 'read' message, the community string is augmented as "public.x", as a non-limiting example, where x is the chassis slot location (#) of the channel unit being addressed. For a 'write' message to the addressed channel unit #y, the community string is augmented as "private.y", as a non-limiting example.

In accordance with the protocol of the distributed embedded in-band management scheme of the present invention, each channel unit, including the master channel unit, is programmed to discard any augmented community string message that does not also include its associated appendix, but to accept an augmented community string message, that also includes its associated appendix. Consequently, only the target channel unit will accept the SNMP message encoded with either of the prescribed community strings and the auxiliary "dot-#" appendix.

DETAILED DESCRIPTION

Figures 1, 3, 4:
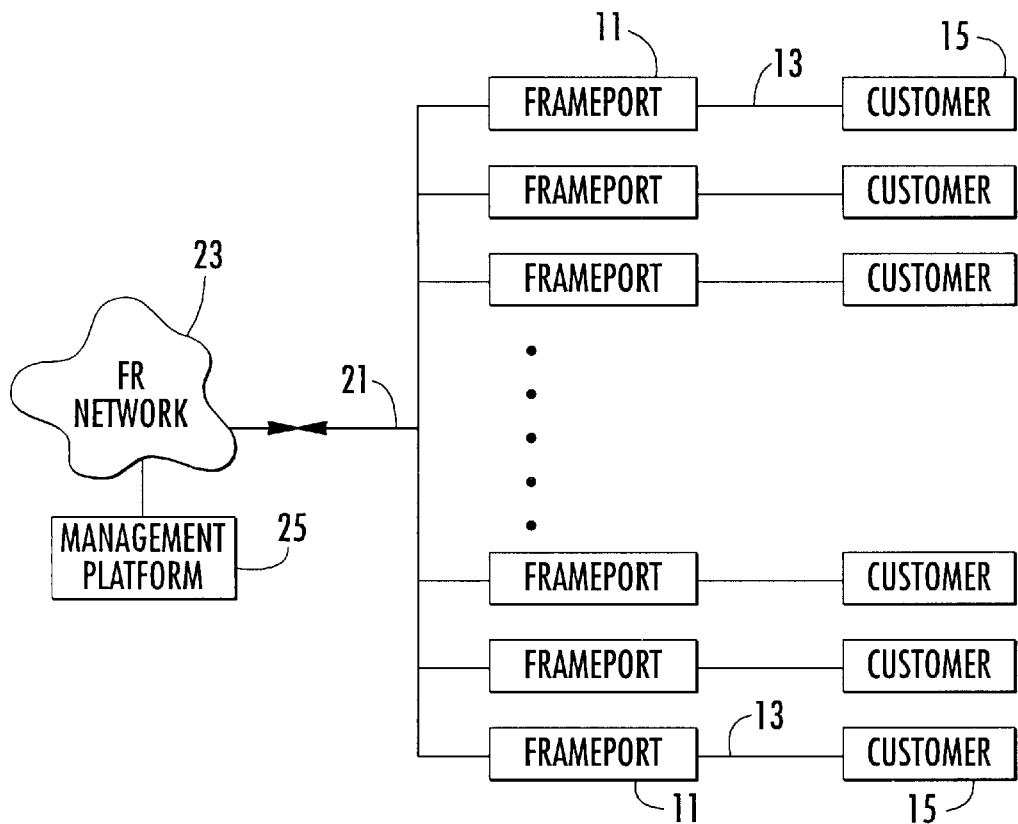
FIG. 1 diagrammatically illustrates the general architecture of a frame relay switching network.
FIG. 3 shows an augmented community string for a 'read' message to a specified channel unit, in accordance with the distributed management scheme of the present invention.
FIG. 4 shows an augmented community string for a 'write' message to a specified channel unit, in accordance with the distributed management scheme of the present invention.

Before describing in detail the distributed data routing management mechanism of the present invention, it is to be understood that the invention primarily resides in a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts are primarily intended to show the major components of a statistically multiplexed frame relay system in a convenient functional grouping and processing sequence, whereby the present invention may be more readily understood.

As pointed out briefly above with reference to the network architecture diagrammatically illustrated in FIG. 1, each of a plurality of data communication devices in the form of frame relay channel units 11 is coupled to or shares the same aggregate data link 21 from the network 23, so that each channel unit will 'see' the same (packetized) data traffic coming in from the network. As each channel unit is continuously looking for an IP address within the data link circuit identifier (DLCI) portion of any incoming packet, that has been generated at management console (such as an SNMP console) and transmitted therefrom over the network by way of a PVC. Since the virtual circuit does not extend beyond the channel unit, all channel units within a common installation (chassis) will assume that the IP address in the destination field as their identity.

Figure 2:
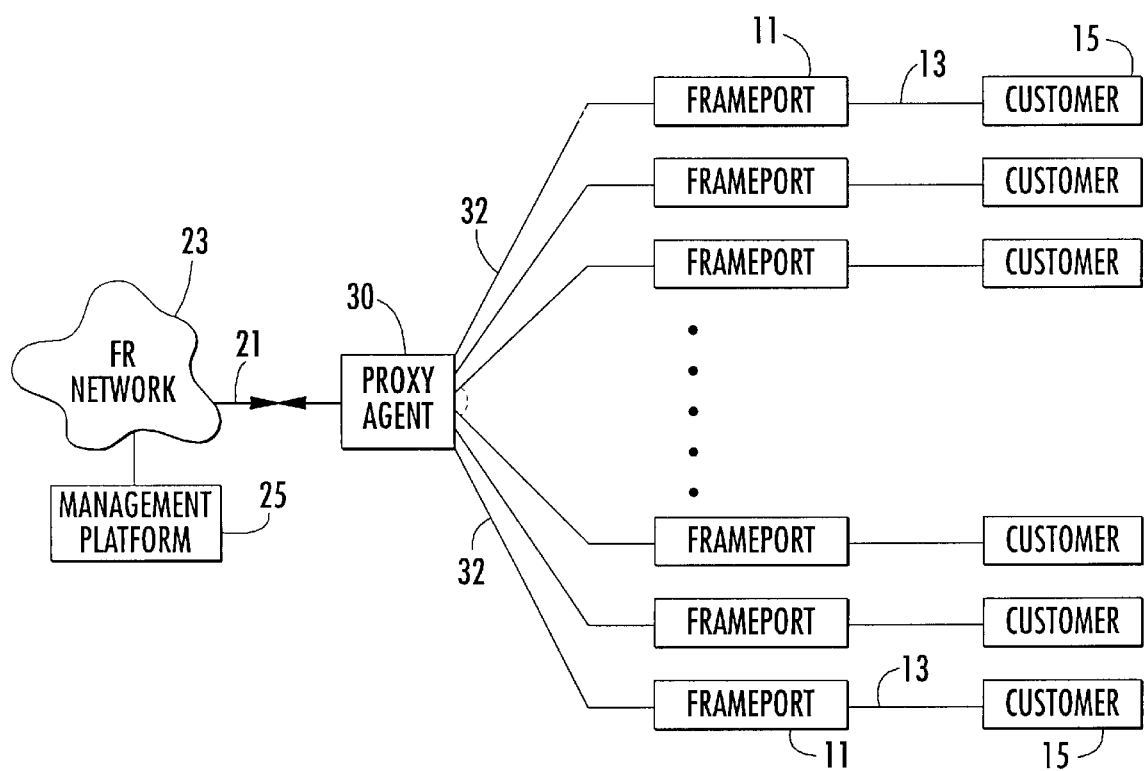
FIG. 2 diagrammatically illustrates the general architecture of a frame relay switching network employing a single intermediary proxy device as the management agent between the network management subsystem and the devices being managed.
Figure 2A:
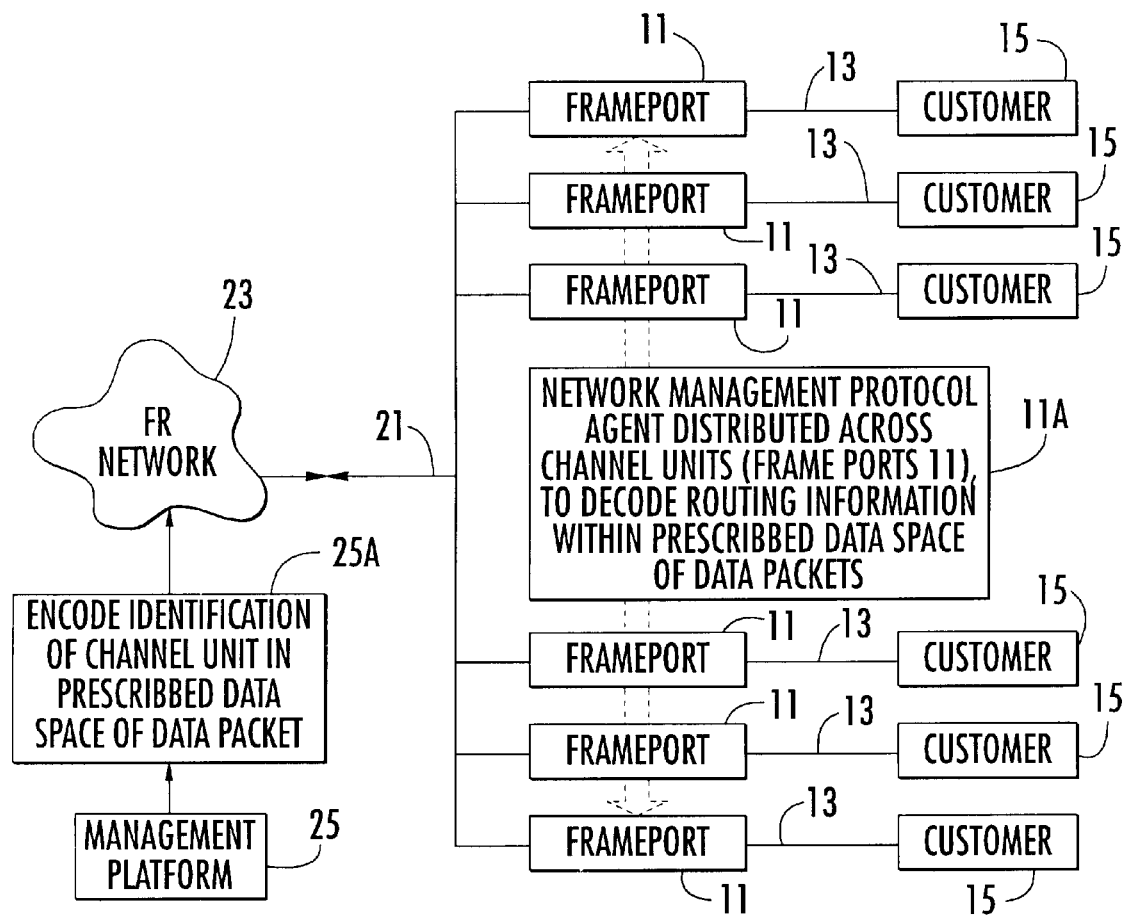
FIG. 2A diagrammatically illustrates the general architecture of a frame relay switching network employing the distributed data routing management mechanism of the present invention.

As shown in FIG. 2A, in order to obviate the use of a proxy device as a management intermediary between the network and each of the channel units, the present invention distributes the management agent 11A across each of the channel units by embedding auxiliary device specific address information in the (ASCII) community string of an SNMP packet generated by the management platform 25A as shown at 25A.

In particular, as diagrammatically illustrated in FIGS. 3 and 4, in order for a network-coupled management platform (such as a Hewlett-Packard "Open View" platform, referenced above), to specify a selected channel unit among a plurality of devices, the community string is encoded to include an auxiliary "dot-channel unit number" appendix to a community string that otherwise will evoke a response from only a single 'master' channel unit.

Customarily, one of the channel units (a master channel unit), that is installed at a prescribed physical location in the chassis (e.g., the lowest numbered card slot) is configured to function as an interrogatable chassis status information source, that can be accessed from the network-coupled management platform. As such, the master channel unit may respond to device common functions, such as user datagram protocol (UDP) packet Internet groper (ping) inquiries, for the chassis (which is not SNMP capable) with system parameters, such as those defined in the System group of MIB II, respond to requests for occupation status of the chassis (i.e., which channel unit card slots are occupied and their current indicator status), and accept write messages to system level parameters, such as trap IP addresses and TFTP addresses. It then forwards that information to the other devices located in the same chassis. It may be noted that even though the master channel unit generates response messages, it only forwards whatever information is provided each physical location; the master channel unit itself has no knowledge of specifics of any of the devices. This facilitates the installation of additional devices without the need to modify already installed devices. In addition, the master channel unit may generate congestion traps for the chassis.

In order to conduct a read request to the master channel unit, a first prescribed (default) community string (e.g., "public" as a non-limiting example) may be employed. In order to write a message to the master channel unit, a second prescribed (default) community string (e.g., "private" as a non-limiting example) may be employed. As pointed out briefly above, in accordance with the encoding scheme for the distributed management scheme of the present invention, unless a given channel unit sees one of these prescribed community string appendices associated with only that channel unit, the message is to be discarded.

As a consequence, all channel units other than the master channel unit (e.g., that installed channel unit whose card slot location is the lowest numbered slot) will discard any message containing one of the above community strings without the appendix. This readily allows only the master channel unit to respond to SNMP messages encoded with either of the prescribed community strings.

On the other hand, to communicate with a particular channel unit within the chassis, the supervisory management platform uses the same community string for accessing the master channel unit, plus an auxiliary appendix that identifies the card slot number of the target channel unit, which number specifies the physical location or slot within the chassis where the channel unit of interest has been installed. For this purpose, as shown in FIG. 3, for a 'read' message, the community string is augmented as "public.x", where x is the chassis slot location (#) of the channel unit being addressed. As shown in FIG. 4, for a 'write' message to the addressed channel unit #y, the community string is augmented as "private.y".

In accordance with the protocol of the distributed embedded in-band management scheme of the present invention, each channel unit, including the master channel unit, is programmed to discard any augmented community string message, that does not also include its associated appendix, but to accept an augmented community string message, that also includes its associated appendix. Consequently, only the target channel unit will accept the SNMP message encoded with either of the prescribed community strings and the auxiliary "dot-#" appendix.

As will be appreciated from the foregoing description, the above-discussed shortcomings of conventional data routing management schemes are obviated by eliminating a proxy device and distributing the management agent among individual channel units of the system. Distributing the management agent is readily implemented by means of an address protocol employed by the management platform that encodes the (ASCII) community data space of an SNMP packet to encode the address of an individual channel unit installed within a multi-device chassis.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. For use with a digital data communication network, wherein a plurality of channel units are coupled to respective access lines for associated user equipment, and are operative to interface data that has been transported over a shared aggregate data communication link onto respective ones of said access lines for delivery to said associated user equipment, a method of managing the routing of data from said shared aggregate data communication link to said channel units comprising the steps of:

(a) distributing a network management protocol agent among said plurality of channel units, exclusive of any intermediate proxy device, said network management protocol agent being operative to decode routing information for a specified channel unit within a prescribed data space of a data packet; and (b) via a management platform coupled to said network, encoding the identification of an individual channel device for whom said data packet is intended in said prescribed data space of said data packet.

2. The method according to claim 1, wherein step (b) comprises encoding the address of an individual channel unit for whom a data packet is intended as an augmented community string, said augmented community string containing information associated with said individual channel unit and wherein, within respective ones of said channel units, said network management protocol agent is operative to discard a message whose community string does not include said information associated with said respective ones of said channel units.

3. The method according to claim 2, wherein said information associated with said individual channel unit comprises the appendix ".#", where # is the physical location of said individual channel unit in a bank of said plurality of channel units.

4. The method according to claim 3, wherein, for performing a read request, step (b) comprises encoding the address of said individual channel unit as an augmented community string "public.#".

5. The method according to claim 3, wherein, for performing a write request, step (b) comprises encoding the address of said individual channel unit as an augmented community string "private.#".

6. The method according to claim 3, wherein step (b) comprises encoding the address of a master channel unit as a community string, exclusive of information associated with any individual channel unit.

7. The method according to claim 1, wherein data is transported over said shared aggregate data communication link using simple network management protocol.

8. A data packet routing system for a frame relay switching network comprising:

a plurality of frame relay-based channel units coupled to respective access lines for associated user equipment, and being operative to interface data that has been transported over a shared aggregate data communication link onto respective ones of said access lines for delivery to said associated user equipment; and a network management protocol agent distributed among said plurality of channel units, exclusive of a proxy device intermediate said network and said channel units, and being operative to decode routing information for a specified channel unit within a prescribed data space of a data packet that has been encoded by a management platform coupled to said network.

9. The data packet routing system according to claim 8, wherein data is transported over said shared aggregate data communication link using simple network management protocol.

10. The data packet routing system according to claim 8, wherein said management platform is operative to encode the address of an individual channel unit for whom said data packet is intended as an augmented community string, said augmented community string containing information associated with said individual channel unit and wherein, within respective ones of said channel units, said network management protocol agent is operative to discard a message whose community string does not include said information associated with said respective ones of said channel units.

11. The data packet routing system according to claim 8, wherein said information associated with said individual channel unit comprises an appendix ".#", where # is the physical location of said individual channel unit in a bank of said plurality of channel units.

12. The data packet routing system according to claim 11, wherein, for a read request, the address of said individual channel unit is encoded as an augmented community string "public.#".

13. The data packet routing system according to claim 11, wherein, for a write request, the address of said individual channel unit is encoded as an augmented community string "private.#".

14. The data packet routing system according to claim 11, wherein the address of a master channel unit is encoded as a community string, exclusive of information associated with any individual channel unit.

\* \* \* \* \*